United States Patent [19]

Bowers et al.

[11] 3,889,821

[45] June 17, 1975

[54] APPARATUS FOR LOADING AND UNLOADING SUSCEPTORS FROM REACTOR

[75] Inventors: Gerald M. Bowers, Los Altos; Norman S. Cay, Los Gatos, both of Calif.

[73] Assignee: Unicorp Incorporated, Sunnyvale, Calif.

[22] Filed: Jan. 24, 1974

[21] Appl. No.: 436,339

[52] U.S. Cl. ................................ 214/1 BB; 198/218
[51] Int. Cl. ................................ B23q 7/06
[58] Field of Search ................ 214/1 B, 1 BB, 1 BT; 198/218

[56] References Cited

UNITED STATES PATENTS 3,819,061 6/1974 Andersson ........................ 214/1 BB

*Primary Examiner*—Robert J. Spar
*Assistant Examiner*—George F. Abraham
*Attorney, Agent, or Firm*—Limbach, Limbach & Sutton

[57] ABSTRACT

An apparatus for use with semi-conductor manufacturing reactors to aid an operator in accurately positioning a semiconductor wafer carrying susceptor in a reactor tube and removing a susceptor therefrom in a manner that significantly reduces the amount of contaminating dust produced by present techniques of sliding the susceptor holder in and out of the reactor tube on its bottom. Two carriages movable on a frame in a direction in and out of the reactor tube are provided, one carriage being provided for gently lifting and lowering the forward end of the susceptor as the other carriage is moved under or out from under the susceptor holder.

6 Claims, 5 Drawing Figures

APPARATUS FOR LOADING AND UNLOADING SUSCEPTORS FROM REACTOR

BACKGROUND OF THE INVENTION

This invention relates to an accessory for use with semi-conductor deposition reactors and more particularly for an accessory to aid in moving semi-conductor wafers to be treated into and out of a reactor tube.

Reactors used in the manufacture of batches of tiny electronic circuit containing semi-conductor chips normally include a reactor tube and some means of heating semi-conductor wafers within the tube. The reactor tube is shaped with a flat bottom. A susceptor which carries a large number of semi-conductor wafers on its top surface is moved into and out of the reactor tube during the processing of the wafers carried thereby. The susceptor is a high heat conductive material normally mounted on a quartz susceptor holder. The reactor tube itself is normally quartz and the semi-conductor wafers therein are indirectly heated by a radio frequency coil surrounding the reactor tube. The coil induces heat producing eddy currents in the susceptor. Chemicals are introduced into the reactor tube in vapor form after the wafers have reached a predetermined temperature and a chemical reaction takes place therewith on the surface of the wafers. When one batch is reacted, its susceptor carrier is removed from the reactor tube and a new batch of wafers either on the same or a different susceptor are then positioned in the reactor tube for a subsequent deposition batch.

Susceptors and their holders are presently loaded into and unloaded from the reactor tube by the hands of an operator who slides the holder over the bottom of the reactor tube. The material of the susceptor holder and reactor tube is usually quartz. This sliding results in the generation of dust which contaminates the atmosphere within the reactor tube and results in an inferior semi-conductor product being formed therein.

Therefore, it is a primary object of the present invention to provide a device for assisting manual loading and unloading of a susceptor and its holder into and out of a reactor tube in a manner minimizing the frictional contact with the susceptor holder and the bottom of the reactor tube, thereby minimizing the generation of undesirable dust particles within the reactor tube.

It is another principal object of the present invention to provide a susceptor loading and unloading device which permits repeatable accurate positioning of the susceptor within the reactor tube, thereby to improve the uniformity of the semiconductor product produced thereby.

SUMMARY OF THE INVENTION

Briefly, these and additional objects are accomplished by the present invention wherein a loading device is positioned at the entrance of a reactor tube which has main and lifting carriage assemblies that are slidable with respect to a main mounting frame toward and away from the reactor tube for carrying a susceptor holder. The lifting carriage assembly includes a lifting element that moves the front of the susceptor holder up and down at the appropriate times for moving the susceptor onto and off of the main carriage assembly as it is moved into and out of the reactor tube.

The main carriage assembly includes a pair of cam surfaces on opposite sides thereof, the cams being identically shaped and positioned as mirror images of one another. The horizontal separation between the cams varies along their lengths, this distance being a maximum at their ends with a segment in the middle of the length of each cam being straight and positioned parallel to one another. The lifting carriage assembly includes cam followers which ride on these horizontally varying cam surfaces in a manner to convert that horizontal motion into vertical motion of the lifting element. This is accomplished by the lift carriage assembly having a pair of rods pivotally attached to each other at the lifting element.

As the main carriage assembly is moved into the reactor tube to remove a susceptor therefrom, the lifting element engages the front of the susceptor holder and lifts it above the floor of the reactor tube to make way for the main carriage assembly to move thereunder. As the main carriage assembly reaches its maximum position within the reactor tube, the shape of the cams spreading apart again results in the front edge of the susceptor holder being dropped down onto the main carriage assembly. The susceptor and its holder can then be withdrawn from the reactor tube by withdrawing the main carriage therefrom which rides on the bottom of the reactor tube on low friction wheels. A susceptor and its holder are positioned into a reactor tube on the main carriage assembly and removed therefrom by the subsequent coaction of the two carriage assemblies as the main carriage is manually removed from the reactor tube.

The lifting of the susceptor holder above the reactor tube when moving the susceptor and its holder into and out of the reactor tube minimizes the frictional engagement therebetween and thus significantly reduces the undesirable dust that can be generated by such friction. A mechanical stop is provided for the lift carriage assembly so that each susceptor and its holder are positioned at the same depth within the reactor tube, thereby aiding in the uniformity of the semi-conductor product. This loading device reduces the amount of maintenance that is required on the reactor tube and also lengthens the tube life. Use of the loader according to the present invention also minimizes the operator judgment which must be exercised in regard to positioning.

Additional objects, advantages and features of the present invention will become apparent from the following description of its preferred embodiment which should be taken in conjunction with the accompanying drawings.

DESCRIPTION OF A PREFERRED EMBODIMENT

Figure 1:
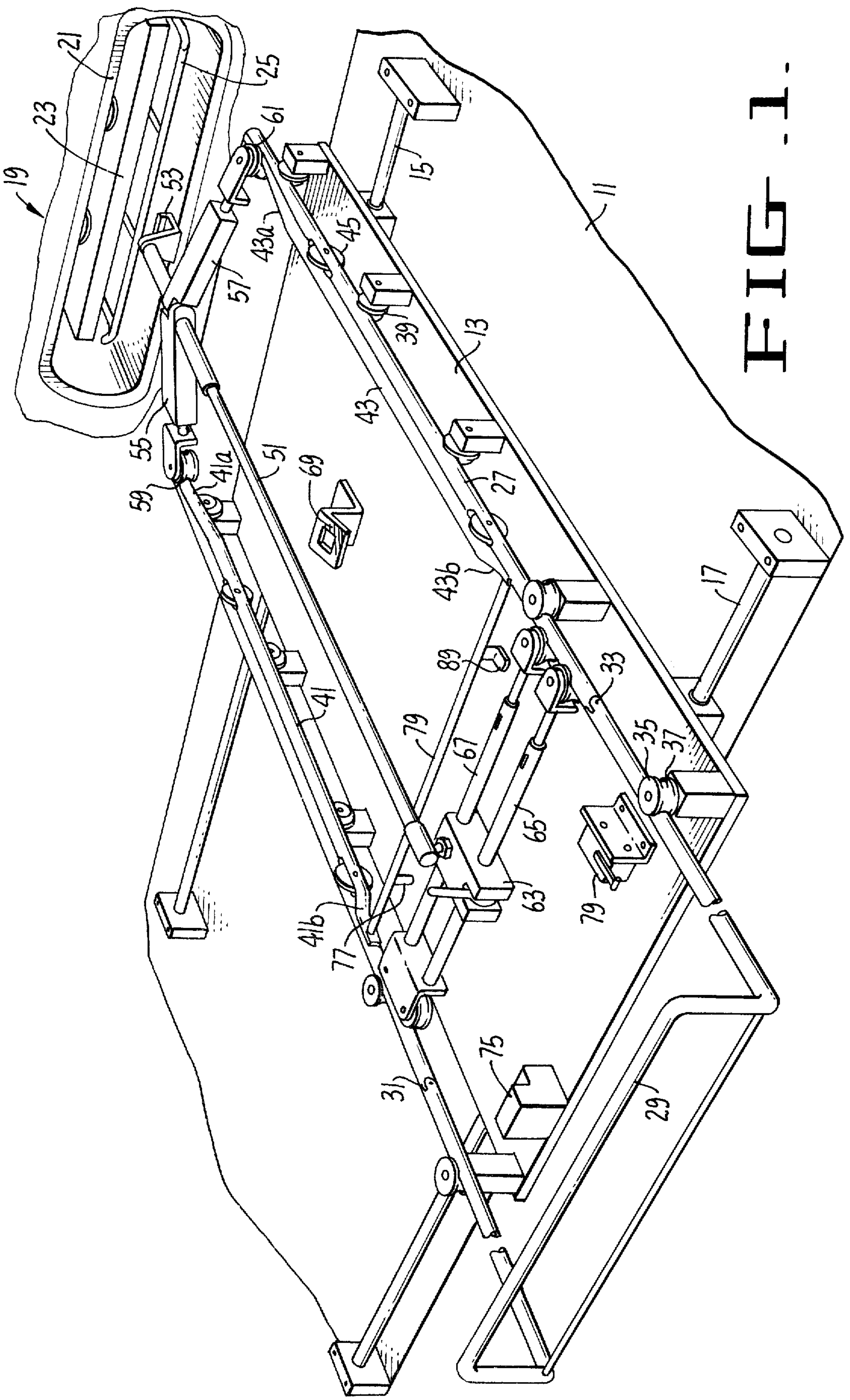
FIG. 1 shows in a perspective view a susceptor loading device according to the present invention.

Referring initially to FIG. 1, the overall cooperation of the loading device according to the present invention with a reactor will be pointed out. A flat table surface 11 supports a plate 13 which serves as the main frame to the loading device. The plate 13 is carried by forward and rear transverse slide rods 15 and 17, respectively. The transverse slide rods are supported above the surface 11 by appropriate mounting blocks.

The transverse sliding capability of the loader frame 13 is desirable to service two adjacent reactors with one such loader. FIG. 1 shows a cut away view of a small portion 19 of a reactor including a reactor tube 21 (made of quartz). Radio frequency induction coils (not shown) surround the tube 21. The semi-conductor wafers being processed within the reactor tube 21 are carried by a removable susceptor 23 which is generally made of graphite material. The energy from the radio frequency coils induces electrical eddy currents in the susceptor 23, resulting in heating the susceptor and the semi-conductor wafers carried thereby. The susceptor 23 is positioned on a holder 25 made of quartz rod material. Another such reactor, not shown, is generally placed to the left of the reactor 19 (FIG. 1) so that the loader frame 13 may be slid along the transverse rods 15 and 17 between the two reactor tubes.

The susceptor 23 and its holder 25 are moved by hand into and out of the reactor tube 21. The method of such removal is usually by sliding the holder 25 along the bottom surface of the reactor tube 21. This results in generating fine dust, as discussed previously, which then contaminates the atmosphere within the reactor tube 21 and results in formation of imperfect semi-conductor elements. The susceptor loader of the present invention significantly reduces the amount of scraping of the holder 25 on the bottom of the reactor tube 21 by supporting the susceptor 23 and its holder 25 up above the floor of the reactor tube 21 when moving.

Figures 2, 3, 4:
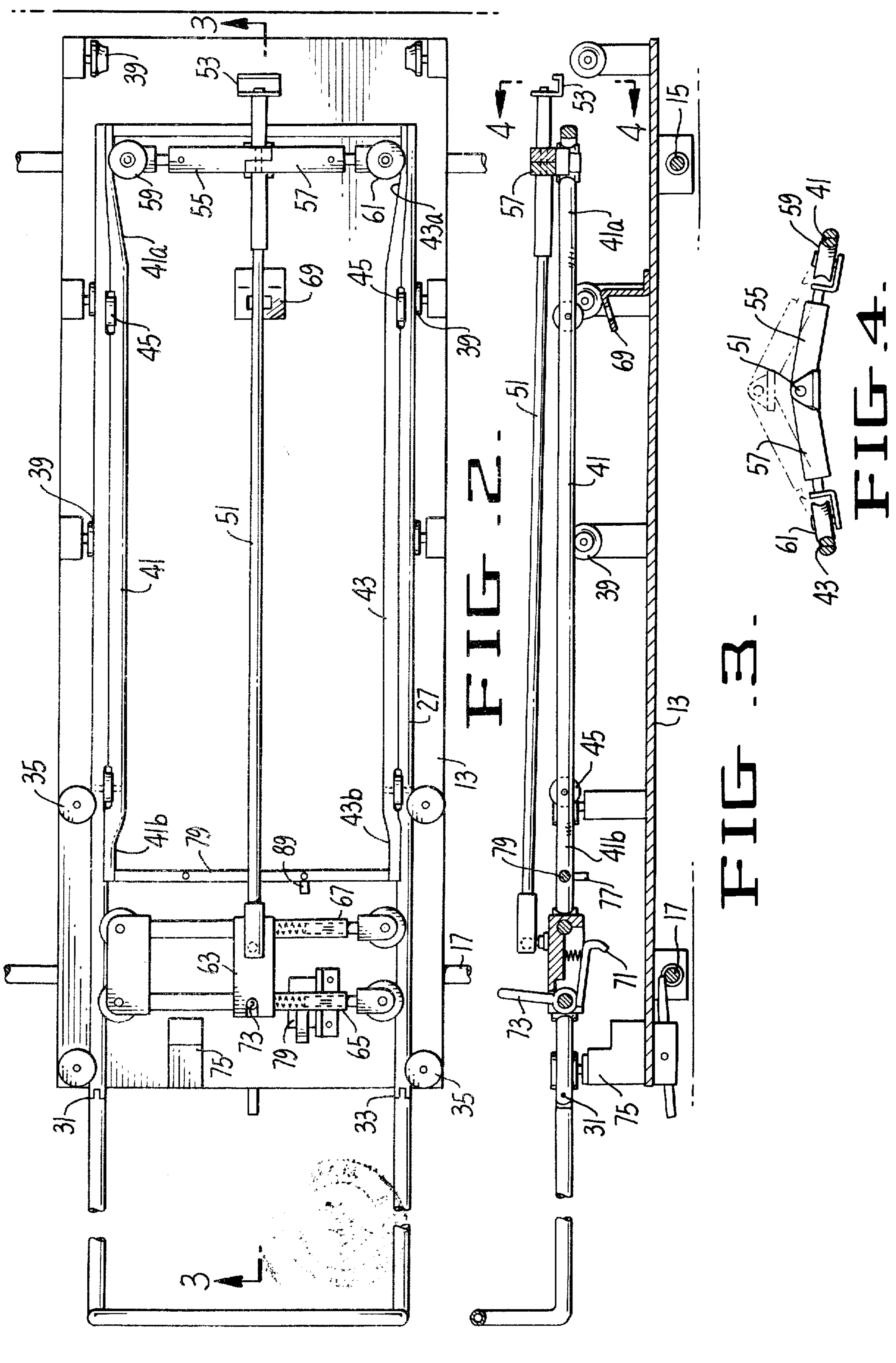
FIG. 2 is a plan view of the device of FIG. 1.
FIG. 3 is a sectional view of the device of FIGS. 1 and 2 taken across section 3—3 of FIG. 2.
FIG. 4 is a detailed view of a component of the device of FIGS. 1-3 taken at section 4—4 of FIG. 3; and, FIG. 5 illustrates the operation of the device of FIGS. 1-4 in the sectional view of FIG. 3 in its various susceptor loading and unloading positions.

Referring to FIGS. 1–3, the two carriage assemblies are illustrated in detail. A main carriage assembly is formed with a closed loop rectangular shaped tube frame 27 as its main element. The frame 27 lies in a single plane except for an upturned handle portion 29 at its rearward edge. Also, hinges 31 and 33 are interposed along the long sides of the frame 27 so that its rearward portion may be turned upward and out of the way when the frame 27 is pulled backward so that the hinges 31 and 33 fall to the rear of the frame 13, the position illustrated in FIGS. 2 and 3. The tubular main carriage frame 27 rides back and forth in a horizontal path into and out of the reactor tube 21 on a plurality of grooved wheels along each side of the frame 27 that are rotatably held a distance above the main frame plate 13. Each of the rear wheels, of which the wheel 35 is an example, has a vertical axis and a groove, such as the groove 37, extending around its outside circumferential surface and sufficiently deep therein so that the groove edges thereof provide support to the carriage frame 27 in a vertical direction. The forward wheels, such as the wheel 39, have horizontal axes to provide strong support of the weight of the main carriage assembly. The main carriage assembly moves back and forth in a plane that is horizontal to the main frame plate 13 by proper positioning of the various supporting rollers.

The main carriage assembly includes mirror image cam rods 41 and 43 positioned along the long sides of the rectangularly shaped carriage frame 27 at its forward end. Taking the cam 43 as typical, a large segment along its length in the middle thereof is a straight line, the straight line portions of each of the cams 41 and 43 being substantially parallel to each other. At their forward edges 41(*a*) and 43(*a*), however, the cams 41 and 43 each moves outward closer to the frame 27. Similarly, at their rear portions 41(*b*) and 43(*b*), the cam rods are shaped to gradually move outward from their straight line portions to the frame 27. Pinned inbetween each of the cam rods 41 and 43 are a pair of wheels constrained to rotate about a horizontal axis, such as a wheel 45. These wheels ride on the bottom of the reactor tube 21 in aiding the support of the loader assembly and its susceptor load. These wheels are made to be of a very friction free material and as thin as possible so as to produce as little friction with the loader assembly and the floor of the reactor tube as possible.

The second carriage assembly is a lift carriage including a support rod 51 extending in the direction of travel and having a lifting element 53 attached at one end thereof. The lifting element 53 is shaped to engage the front rod of the susceptor support 25 for lifting the support and susceptor thereon. The forward end of the rod 51 is held by a pair of pivot arms 55 and 57 which are each pivotably attached at one end to the rod 51. The pivot arms 55 and 57 include cam following rollers 59 and 61, respectively, at their opposite ends. The rollers 59 and 61 ride along the main carriage assembly cam rods 41 and 43 as the lift carriage assembly is moved back and forth with respect to the main carriage assembly. As a result of the horizontal variations in shape of the cam rods 41 and 43, the lifting element 53 moves up and down under cam control in response to relative movement between the lift and main carriage assemblies.

The total length of the pivot arms 55 and 57 from one cam wheel 59 to the other cam wheel 61 is made to exceed the maximum horizontal distance between the cam rods 41 and 43 as shown in FIGS. 1–4. As the cam following wheels 59 and 61 move along the length of the cam rods 41 and 43 to their narrowest straight line parallel portion, the pivot arms 55 and 57 pivot upwards in a manner shown in dotted outline in FIG. 4. This results in raising the lifting element 53. As a result of the cooperating structure between the main and lift carriage assemblies, the lifting element 53 is at its lowest position when the lift carriage assembly is at either its forward most or rearward most position with respect to the main carriage assembly. The lift element 53 is elevated to its highest position when the lift carriage assembly is in a position where the cam wheels 59 and 61 are supported by the straight line portions in the middle of the length of the cam rods 41 and 43.

The support rod 51 of the lift carriage assembly is itself supported at its rearward most end by a block 63 that itself is supported by a pair of parallel horizontal rods 65 and 67 which terminate at opposite ends in rollers for contacting the main outside frame 27 of the main carriage assembly. A lift carriage mechanical stop 69 is attached to the main frame plate 13 of the loading device and has an aperture which cooperates with a mechanical hook 71 (FIG. 3) to positively position the lift carriage assembly along its direction of travel. As will become apparent hereinafter, this latching mechanism provides positive repeatable positioning of the susceptor 23 within the reactor tube 21. The lifting element 53 is accurately positioned within the reactor tube 21 when the latching elements 69 and 71 are engaged. This latch can be disengaged by the operator mechanically pulling a release lever 73 and then moving by hand the lift carriage assembly rearward. This latch occurs, because of the shape of the latching elements as clearly shown in FIGS. 1 and 3, as the lift carriage assembly is pushed forward. The latching element 71 is resiliently urged downward by a spring as shown in FIG. 3.

A positive mechanical stop 75 is provided on the main frame plate 13 at its rear edge. An engaging locking element 77 is attached to a cross support member 79 on the main carriage assembly. This prevents an operator from withdrawing the main carriage assembly too far. An electrical switch 79 is also provided on the plate 13 and is engaged by an actuator 89 which is also attached to the underside of the cross support member 79. As the main carriage assembly is withdrawn nearly to its maximum amount, the switch 79 is actuated which can serve a control function with the reactor. This switch is activated only when the loading assembly being described is fully withdrawn out of the reactor tube 21 and thus indicates that certain processing can be initiated.

Figure 5:
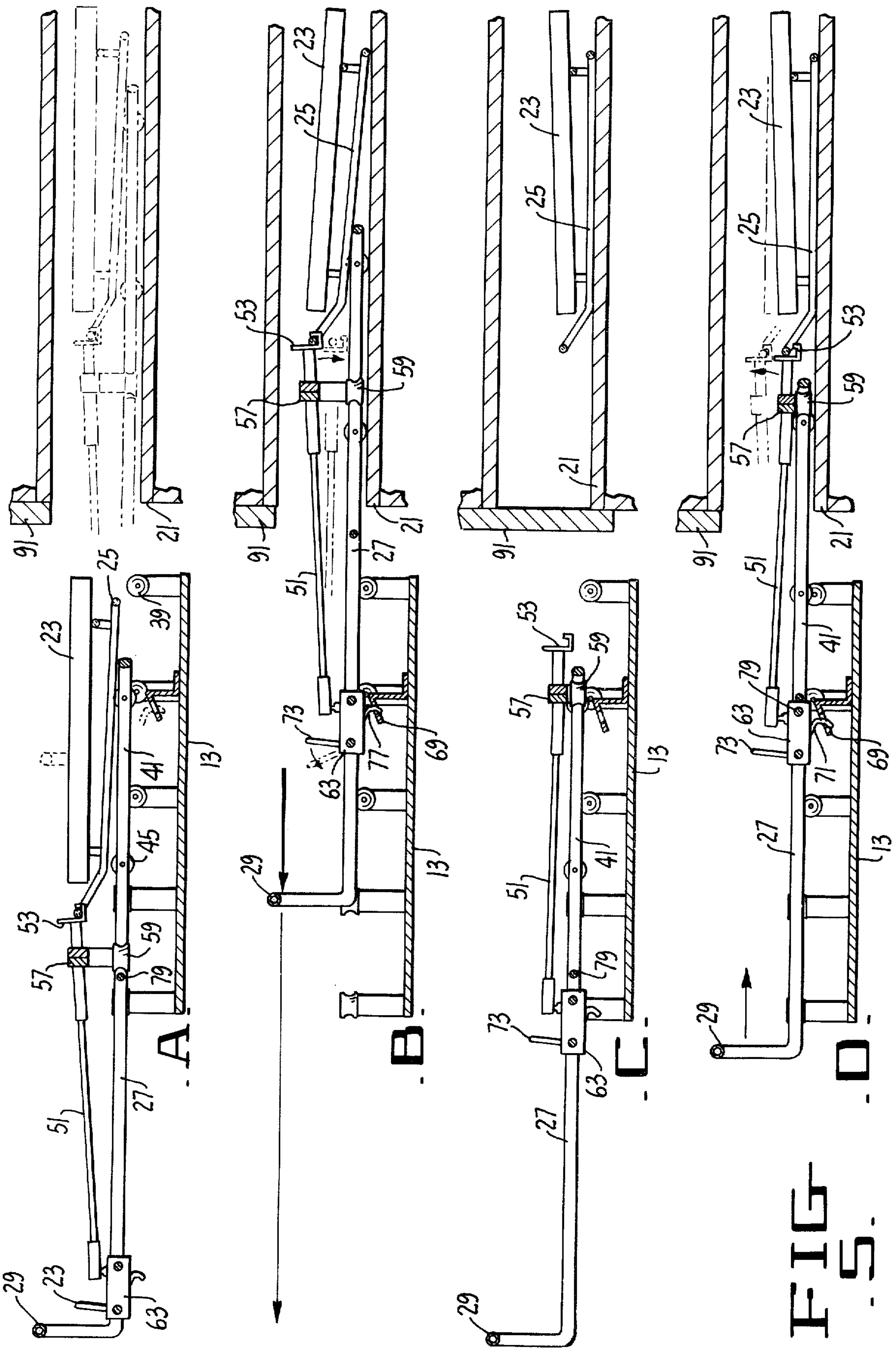

FIG. 5 shows various operating positions of the loader described above with respect to FIGS. 1–4 as the susceptor 23 and its holder 25 are loaded into and out of the reactor tube 21 having a door 91. FIG. 5A shows in solid lines the positions of the main carriage assembly (identified by its main frame rod 27) and the lift carriage assembly including the support rod 51 and the lifting element 53 (hook) in their fully rearward retracted positions. In this fully retracted position, it will be noted that the lift carriage assembly is pulled back so that its rollers 59 and 61 engage the front surface of the support member 79 of the main carriage assembly. The main carriage assembly itself is pulled back so that the catch 77 has engaged the block 75. In these positions, the loading apparatus may receive the susceptor 23 and its holder 25 which is laid on the main carriage assembly as shown in FIG. 5A. The holder 25 is supported in this position by the lift element 53 and the main frame 27. An operator then pushes the handle 29 of the main carriage assembly forward and everything moves with respect to the plate 17. The susceptor 23 moves into the reactor tube 21 and the wheels, such as the wheel 45, on the main carriage assembly of the loading apparatus rides on the bottom of the reactor tube 21. It will be noted that the loading apparatus is adjusted in elevation with respect to the reactor tube 21 so that this occurs smoothly.

When the apparatus is moved entirely within the reactor tube 21 as shown in FIG. 5A in dotted outline, the catch 77 engages its mate 69 as shown in dotted outline in FIG. 5A and in solid line in FIG. 5B. The operator then pulls back the handle 29 on the main carriage assembly but the lift carriage assembly does not move since it is attached by its latching mechanism to the plate 13. Movement of the main carriage assembly results in the cam arms 55 and 57 pivoting to lift the hook 57 upwards in engagement with the bottom of a forward rod of the susceptor holder 25. This tips the susceptor holder off of the main carriage assembly frame 27 so that it contacts the bottom of the reactor tube 21. The susceptor holder 25 is then held at its furthest point with the reactor tube 21 by the floor of the reactor tube itself and at its opposite end by the lift element 53 of the loading assembly. This support remains until the main carriage assembly is moved outward to the point where the cam following rollers 59 and 61 reach the portions 41(*a*) and 43(*a*) of the cam rods of the main carriage assembly.

At this point, the main carriage assembly has been withdrawn completely from under the susceptor support 25 and the expanding distance between the cams 41 and 43 results in the lifting element 53 gently dropping downward as shown in dotted outline in FIG. 5B. This sets down the forward edge of the susceptor holder 25 gently. The operator then pulls back on the release lever 73 so that further movement backwards of the main carriage assembly handle 29 will cause both the main carriage assembly and the lift carriage assembly to move backward and out of the reactor tube 21 to a position shown in FIG. 5C. The door 91 is then closed on the reactor tube and the processing of wafers carried on the top surface of the susceptor 23 may begin.

FIG. 5D illustrates the use of the apparatus of the present invention for removing the susceptor 23 and its support 25 from the reactor tube 21. Both of the main and lift carriage assemblies are moved forward on the loading mechanism frame into the reactor tube 21. Since the susceptor 23 and its holder 25 have previously been placed therein by the same loading device, the lifting element 53 of the loader will come to rest just under the forward bar of the loader 25 as shown in FIG. 5 in solid line. This is the extreme position permitted of the lifting carriage assembly by the latching mechanism formed of elements 69 and 71. The operator then pushes the handle 29 in the main carriage assembly into the reactor tube 21 and the camming action provided against the lift carriage assembly initially lifts up the forward edge of the susceptor 25 in a manner shown in dotted outline in FIG. 5D. Further movement of the main carriage assembly into the reactor tube 21 forces its forward portion of the tubular frame 27 under the susceptor 25 until its extreme position wherein the lifting element 53 permits the forward end of the susceptor holder to drop down onto the main carriage assembly. Both assemblies are then withdrawn from the reactor tube 21 and the susceptor holder 25 and its susceptor 23 are withdrawn therewith. Prior to this withdrawal, the release lever 73 is held by the operator to disengage the latching element 69 and 71 to permit both of the carriage assemblies to move together until they have reached the extreme position shown in FIG. 5A. The susceptor may then be replaced with a new one for insertion into the reactor tube 21 or the same susceptor 23 may be again used with new semi-conductor wafers being placed on the surface thereof.

It will be noted from FIG. 5 that the susceptor holder 25 provides for normally holding the susceptor 23 at a slope with respect to the floor of the reactor tube 21 upon which it rests. This is a standard technique required for good vapor deposition on wafers held by the top surface of the susceptor 23. This slope presents a problem, however, if wafers are to be loaded on the susceptor 23 while it is hot and in such a sloped position. The light weight of the wafers positioned on the surface of the susceptor and its high temperature combine to cause the wafer to slide off of the susceptor if not held by an operator for a time sufficient to warm up the wafer to approximately the same temerature as the susceptor. Thus, operator time is wasted in loading a susceptor if it is held during loading in the tilted position necessary for deposition.

Therefore, the loader of the present invention additionally provides for leveling the susceptor 23 when withdrawn from the reactor tube 21. This substantial leveling operation as shown in FIG. 5A wherein the forward end of the susceptor holder 25 is held up by the lifting element 53. When withdrawn, the hot susceptor 23 may then be loaded with a new set of wafers on its top surface without an operator having to hold the wafer thereon until it is heated up. The cold wafer will not slide off of the susceptor 23 in its substantially horizontal position as shown in FIG. 5A in solid outline. The cams 41 and 43 (see FIG. 2) are made to be closer together at their extreme ends 41(*b*) and 43(*b*) than at their ends 41(*a*) and 43(*a*) so that the lifting element 53 is not dropped down as far at the rear end of the cams as it is at its forward end.

The various aspects of the present invention have been described with respect to a preferred embodiment thereof but it will be understood that the invention is entitled to protection within the full scope of the appended claims.

We claim:

1. An apparatus for loading and unloading a susceptor from a reactor tube, comprising:

a frame, a main carriage slidably held by said frame for movement having a direction of motion between extreme forward and rearward positions with respect thereto, a pair of cam tracks attached to said main carriage to extend generally along said direction of motion and held generally in a horizontal plane, said cams having a varying spacing therebetween along their length with the maximum separation between the cams occurring at the ends thereof, a lift carriage held by said main carriage in a manner to be movable therealong in said one direction, a lifting element mounted forward of said lift carriage, and means as part of said lift carriage and riding along said cam tracks on cam followers for moving said lift element upward as said cam followers contact portions of the cam tracks that are coming closer together and downward as the cam followers contact cam portions that move further apart, whereby the horizontal paths of said cams are converted into vertical motion of said lift element in response to relative movement of said lift carriage back and forth in said one direction along said main carriage.

2. Apparatus according to claim 1 wherein said lift element moving means includes a pair of arms that are each attached at one end together at a pivot, said pivot being attached to said lift element, the opposite ends of said arms being connected to said cam followers, whereby said pivot arms move said pivot point upwards as the cam followers ride on portions of said cams that are moving closer together.

3. Apparatus according to claim 2 wherein said arms pivot about a rod extending in said one direction and having said lift element attached to one end thereof on the forward edge of said pivot arms, and a structure at its other end including support means for sliding along the length of said main carriage in said one direction.

4. The apparatus according to claim 3 wherein in sliding means includes one portion of a catch, a mating portion being attached to said frame, whereby said lift carriage latches when placed in an extreme forward position in said one direction and may be moved thereafter only by a manual disengagement of said latch.

5. Article loading apparatus, comprising:

a frame, a main carriage slidably held by said frame for movement having a direction of motion between extreme forward and rearward positions with respect thereto, a pair of cam tracks attached to said main carriage to extend generally along said direction of motion and held generally in a horizontal plane, said cams having a varying spacing therebetween along their length with the maximum separation between the cams occurring at the ends thereof, a lift carriage held by said main carriage in a manner to be movable therealong in said one direction, a lifting element mounted forward of said lift carriage, and means as part of said lift carriage and riding along said cam tracks on cam followers for moving said lift element upward as said cam followers contact portions of the cam tracks that are coming closer together and downward as the cam followers contact cam portions that move further apart, whereby the horizontal paths of said cams are converted into vertical motion of said lift element in response to relative movement of said lift carriage back and forth in said one direction along said main carriage.

6. An apparatus for loading and unloading a susceptor from a reactor tube, said susceptor being supported on a holder including a rod extending across the susceptor at one edge thereof, said apparatus comprising:

a mounting frame, means supported by said frame for extending forward thereof into the reactor tube an extended distance sufficient to support said susceptor and its holder against gravity, said extending means being shaped to conveniently mate with the underside of said susceptor holder and being movable on said frame to a retracted position outside of said reactor tube, and means carried by said extending means and movable back and forth thereon in said one direction for lifting said susceptor holder at its said front rod in response to movement of said extending means through positions intermediate of said retracted and extended distance positions, whereby said susceptor and its holder may be loaded and unloaded from the reactor tube with a minimum amount of rubbing of the bottom of the susceptor holder with the bottom of the reactor tube said lifting means comprising:

a pair of arms pivotally held together at a pivot point wherein a susceptor holder lifting element is positively attached, the other ends of said rods terminating in cam followers which are shaped to follow a pair of horizontally varying cam track attached to said extending means, whereby movement of said extending means with respect to said lifting means converts the horizontal variations of said cam tracks into vertical movement of said lifting element.

* * * * *